United States Patent
Hong

(10) Patent No.: US 10,371,977 B2
(45) Date of Patent: Aug. 6, 2019

(54) FLEXIBLE DISPLAY DEVICE COMPRISING A PLURALITY OF MICROACTIVITIES AND A PLASTIC LAYER HAVING A FIXED PART AND A FLEXIBLE PART

(71) Applicant: SAMSUNG DISPLAY CO., LTD., Yongin-si, Gyeonggi-do (KR)

(72) Inventor: Wang Su Hong, Hwaseong-si (KR)

(73) Assignee: Samsung Display Co., Ltd. (KR)

(*) Notice: Subject to any disclaimer, the term of this patent is extended or adjusted under 35 U.S.C. 154(b) by 246 days.

(21) Appl. No.: 15/093,518

(22) Filed: Apr. 7, 2016

(65) Prior Publication Data

US 2016/0306222 A1   Oct. 20, 2016

(30) Foreign Application Priority Data

Apr. 14, 2015  (KR) .......................... 10-2015-0052685

(51) Int. Cl.
| | | |
|---|---|---|
| *G02F 1/1333* | (2006.01) | |
| *G02F 1/1335* | (2006.01) | |
| *G02F 1/1341* | (2006.01) | |
| *G02F 1/1345* | (2006.01) | |

(52) U.S. Cl.
CPC ...... *G02F 1/133377* (2013.01); *G02F 1/1341* (2013.01); *G02F 1/13452* (2013.01); *G02F 1/133305* (2013.01); *G02F 1/133528* (2013.01); *G02F 2001/133388* (2013.01)

(58) Field of Classification Search
CPC .......... G02F 1/133377; G02F 2202/02; G02F 1/1341
See application file for complete search history.

(56) References Cited

U.S. PATENT DOCUMENTS

| | | | | |
|---|---|---|---|---|
| 2009/0140253 A1* | 6/2009 | Kasahara | ............ | H01L 27/1214 257/59 |
| 2012/0062448 A1* | 3/2012 | Kim | .................. | G02F 1/133377 345/55 |
| 2014/0002764 A1* | 1/2014 | Seo | ........................ | G02F 1/1343 349/43 |
| 2014/0029230 A1 | 1/2014 | Oh et al. | | |
| 2014/0055726 A1* | 2/2014 | Cho | .................. | G02F 1/134309 349/106 |
| 2014/0098333 A1* | 4/2014 | Kim | .................. | G02F 1/133377 349/106 |
| 2014/0104533 A1* | 4/2014 | Lee | .................... | G02F 1/133377 349/46 |
| 2014/0175463 A1 | 6/2014 | Nam et al. | | |

(Continued)

FOREIGN PATENT DOCUMENTS

| | | |
|---|---|---|
| JP | 2009-163037 A | 7/2009 |
| JP | 2010-48887 A | 3/2010 |
| KR | 10-2012-0026880 A | 3/2012 |

*Primary Examiner* — Paul C Lee
(74) *Attorney, Agent, or Firm* — Innovation Counsel LLP

(57) ABSTRACT

There is provided a display device including: a substrate; a plastic layer formed on the substrate; a plurality of thin film transistors formed on the plastic layer; a pixel electrode connected to the thin film transistor; a roof layer formed on the pixel electrode to be spaced apart from the pixel electrode, having a microcavity disposed therebetween; and a liquid crystal layer within the microcavity, wherein a portion of the substrate is removed to expose the plastic layer.

12 Claims, 25 Drawing Sheets

(56) References Cited

U.S. PATENT DOCUMENTS

| | | | | |
|---|---|---|---|---|
| 2014/0176893 A1* | 6/2014 | Sugitani | ............ | G02F 1/133305 |
| | | | | 349/143 |
| 2014/0184971 A1* | 7/2014 | Yim | ...................... | G02F 1/1368 |
| | | | | 349/43 |
| 2014/0184974 A1* | 7/2014 | Bae | ..................... | H01L 27/1248 |
| | | | | 349/44 |

* cited by examiner

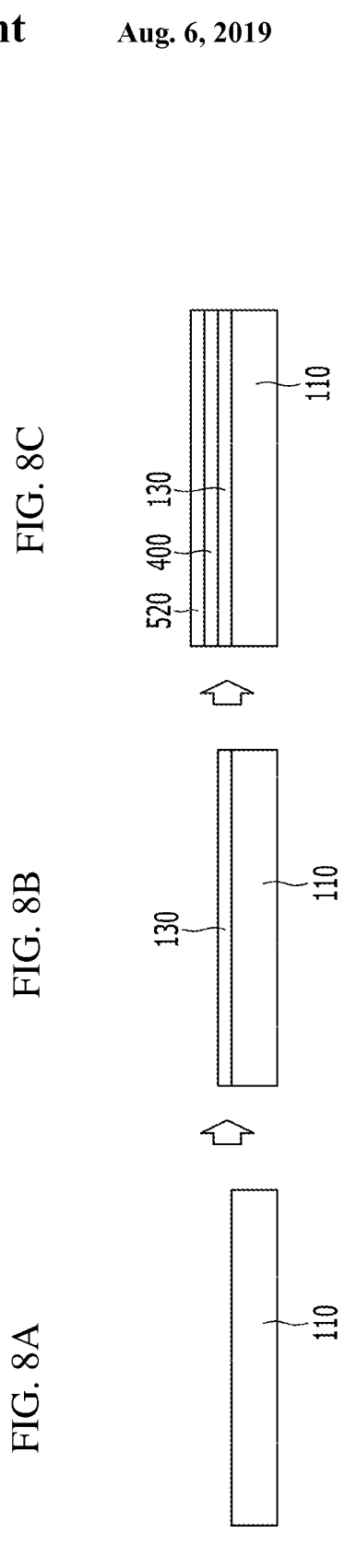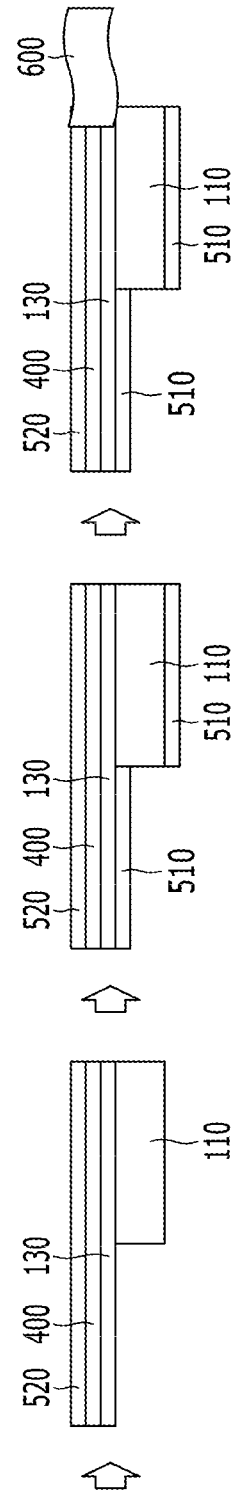

FLEXIBLE DISPLAY DEVICE COMPRISING A PLURALITY OF MICROACTIVITIES AND A PLASTIC LAYER HAVING A FIXED PART AND A FLEXIBLE PART

CROSS-REFERENCE TO RELATED APPLICATION

This application claims priority to, and the benefit of, Korean Patent Application No. 10-2015-0052685 filed in the Korean Intellectual Property Office on Apr. 14, 2015, the entire contents of which are incorporated herein by reference.

BACKGROUND (a) Field

Embodiments of the present invention relate generally to display devices and their manufacture. More specifically, embodiments of the present invention relate to flexible display devices and their manufacture.

(b) Description of the Related Art

A liquid crystal display is one type of flat panel display that has found wide acceptance. It typically includes two sheets of display panels in which field generating electrodes, such as a pixel electrode and a common electrode, are formed. A liquid crystal layer is interposed therebetween, and the display applies a voltage to the field generating electrode to generate an electric field in the liquid crystal layer. This determines an alignment of liquid crystal molecules of the liquid crystal layer and controls a polarization of incident light by the generated electric field, thereby displaying an image.

The two sheets of display panels configuring the liquid crystal display may be a thin film transistor array panel and a counter display panel. The thin film transistor array panel may be formed with gate lines transferring gate signals and data lines transferring data signals, where the gate and data lines intersect each other and are formed with thin film transistors connected to the gate lines and the data lines, pixel electrodes connected to the thin film transistors, and the like. The counter display panel may be formed with a light blocking member, a color filer, a common electrode, and the like. In some cases, the light blocking member, the color filter, and the common electrode may instead be positioned on the thin film transistor array panel.

However, in the liquid crystal display according to the related art, two sheets of substrates are essentially used and each component of the liquid crystal display is formed between the two sheets, thereby causing the display device to be heavy as well as thick and expensive, to require excessive process time to fabricate, and the like.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a display device with reduced weight, thickness, cost, and process time, accomplished by manufacturing the display device using a single substrate.

Further, embodiments of the present invention provide a display device capable of opening a portion of a substrate to thereby form a flexible part and a fixed part, where the flexible part of the display device allows users to freely change a shape of the display device if necessary.

An exemplary embodiment of the present invention provides a display device including: a substrate; a plastic layer positioned on the substrate and including a fixed part and a flexible part; a plurality of thin film transistors formed on the plastic layer; a pixel electrode connected to the thin film transistor; a roof layer facing the pixel electrode; and a liquid crystal layer within a plurality of microcavities formed between the pixel electrode and the roof layer, wherein the substrate is coupled to the fixed part of the plastic layer and the substrate is absent from the flexible part.

The substrate may comprise glass.

The plastic layer may include polyimide.

The flexible part may be sufficiently flexible so as to be folded or rolled.

The flexible part may be foldable so as to contact the fixed part while forming a right angle with respect to the fixed part.

The flexible part may be foldable so as to cover an upper portion of the fixed part.

The display device may comprise multiple ones of the fixed parts, at least some of which may be positioned at edges of the display device, and the flexible part may be positioned at a central area of the display device.

The display device may have a curved shape.

The display device may have a cylindrical shape.

The display device may further include: an overcoat formed on the liquid crystal layer to encapsulate the liquid crystal layer.

The display device may further include: an upper polarizer formed on the overcoat; and a lower polarizer formed beneath the substrate and beneath a portion of the plastic layer exposed from the substrate.

A module connecting part may be attached to the fixed part.

Another embodiment of the present invention provides a method of manufacturing a display device, the method including: forming a plastic layer on a substrate; forming a thin film transistor on the plastic layer; forming a pixel electrode to be connected to the thin film transistor; forming a sacrificial layer on the pixel electrode; forming a common electrode on the sacrificial layer; stacking a roof layer by coating an organic material on the common electrode; forming a liquid crystal injection hole and exposing the sacrificial layer by patterning the roof layer; forming a microcavity between the pixel electrode and the common electrode by removing the sacrificial layer; forming a liquid crystal layer by injecting a liquid crystal material into the microcavity; and removing a portion of the substrate so as to expose at least a portion of the plastic layer.

The manufacturing method may further include: forming an overcoat on the microcavity so as to encapsulate the microcavity.

The manufacturing method may further include: positioning an upper polarizer on the overcoat; and positioning a lower polarizer beneath the substrate and on the exposed plastic layer.

The removing may further comprise removing the substrate from only an area of the plastic layer extending from a center of the plastic layer to an edge of the plastic layer.

The removing may further comprise removing the substrate from a central area of the display device so that portions of the substrate remain at edges of the display device.

The manufacturing method may further include: attaching a module connecting part to an area of the display device corresponding to an area of the plastic layer in which the substrate is not removed.

The plastic layer may include polyimide.

As set forth above, a display device according to exemplary embodiments of the present invention may provide the following benefits.

According to a display device and its manufacture according to exemplary embodiments of the present invention, it is possible to reduce the weight, the thickness, the cost, and the process time of a display device by manufacturing it using the single substrate.

Further, it is possible to provide a flexible display device by removing the substrate from some area of the display device.

BRIEF DESCRIPTION OF THE DRAWINGS

FIG. 8A to FIG. 8F are process diagrams illustrating a method of manufacturing a display device according to an exemplary embodiment of the present invention.

DETAILED DESCRIPTION OF THE EMBODIMENTS

Figure 1:
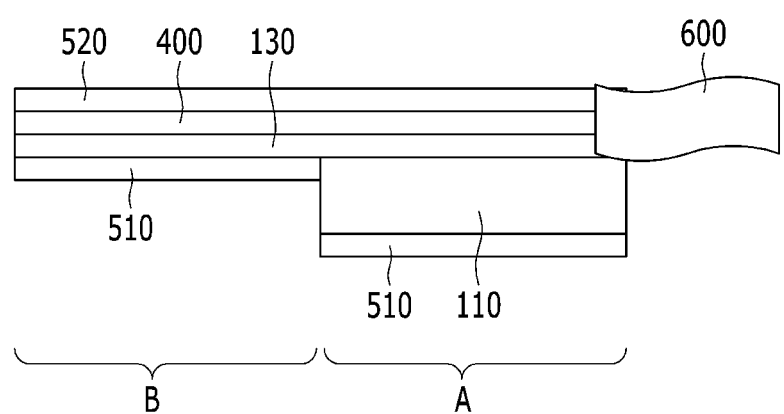
FIG. 1 is a layout view schematically illustrating a side of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. The various Figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

All numerical values are approximate, and may vary. All examples of specific materials and compositions are to be taken as nonlimiting and exemplary only. Other suitable materials and compositions may be used instead.

Hereinafter, a display device according to an exemplary embodiment of the present invention will be described in detail with reference to the accompanying drawings.

FIG. 1 is a layout view schematically illustrating a side of a display device according to an exemplary embodiment of the present invention. Referring to FIG. 1, a display device according to an exemplary embodiment of the present invention includes a substrate 110, a plastic layer 130 on the substrate, a thin film transistor layer 400 on the plastic layer 130, a lower polarizer 510 beneath the substrate 110 and an upper polarizer 520 on the thin film transistor layer 400, and a module connecting part 600 connected to the thin film transistor layer 400.

Referring to FIG. 1, the substrate 110 is formed only in an area corresponding to a portion of the thin film transistor layer 400. That is, the substrate 110 is formed in certain areas of the plastic layer 130 but not in others. Therefore, a portion of the lower polarizer 510 attached beneath of the substrate 110 directly contacts the plastic layer 130.

In the following description, a portion at which the substrate 110 is formed is called a fixed part A and a portion at which the substrate is not formed is a flexible part B. The substrate 110 is opened in the flexible portion B, i.e. flexible portion B corresponds to openings or gaps in the substrate 110.

The module connecting part 600 is attached to the fixed portion A. The fixed portion A is an inflexible area including the substrate 110, and the flexible portion B is a flexible area which does not include the substrate 110 and is formed of a plastic layer 130. Therefore, the module connecting part 600 is attached to the more rigid fixed part A, such that the attaching process may be easy and the module connecting part 600 may be more stably attached to the fixed part A.

Further, since the substrate 110 is not present under the flexible part B, the flexible part B may be relatively easily bent or warped during use.

Hereinafter, a display device according to the exemplary embodiment of the present invention will be described in more detail.

Figure 2:
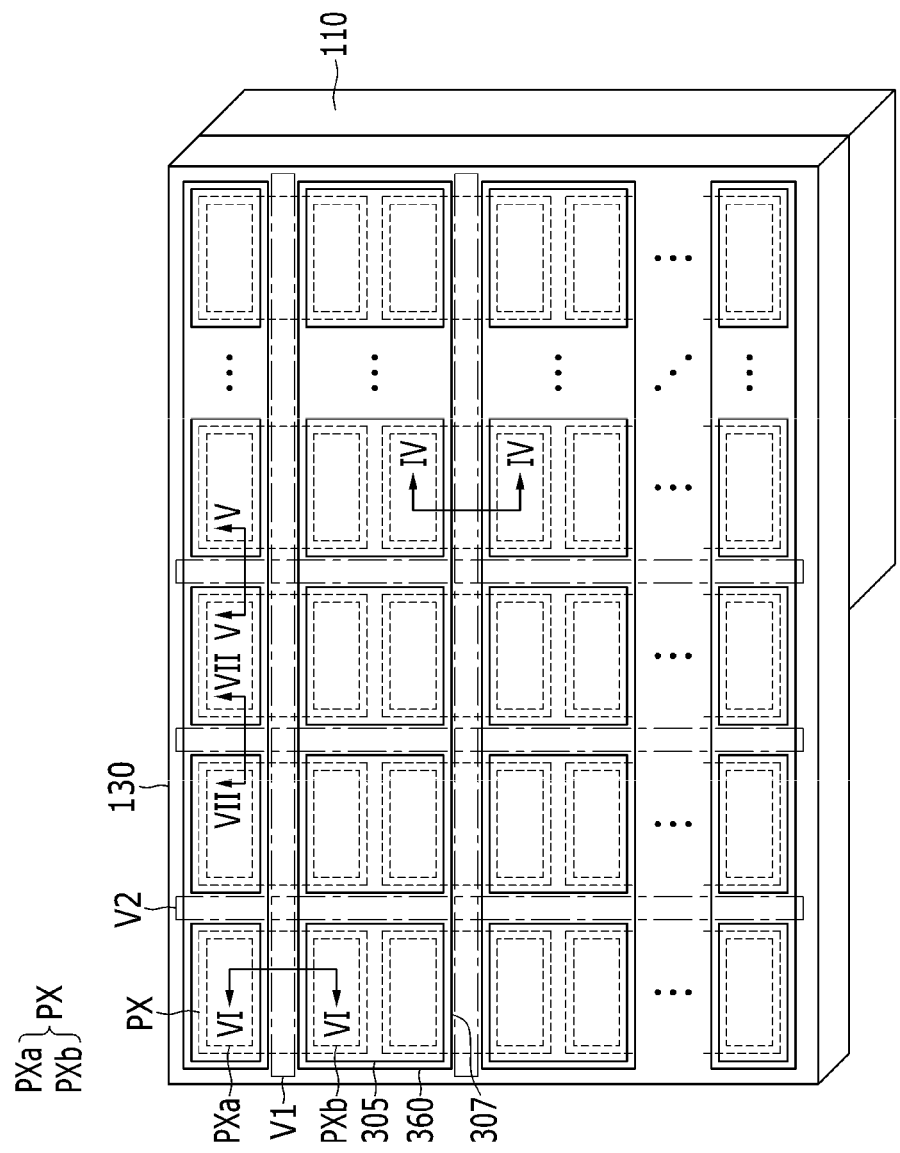
FIG. 2 is a plan view illustrating a display unit of the display device according to the exemplary embodiment of the present invention.

FIG. 2 is a plan view illustrating a display unit of a display device according to an exemplary embodiment of the present invention and for convenience, FIG. 2 illustrates only some components of the display device.

The display device according to the exemplary embodiment of the present invention includes the substrate 110 made of glass or another optically transparent material, the plastic layer 130 on the substrate 110, and a roof layer 360 formed on the plastic layer 130.

As illustrated in FIG. 1, the substrate 110 is formed only in some areas of the device. In contrast, the plastic layer 130 is formed on the whole surface of the device, and thus the roof layer 360 and pixels are positioned on the plastic layer 130.

The plastic layer 130 may be generally made of any suitable plastic material, and may include polyimide but is not limited thereto.

The plastic layer 130 includes a plurality of pixel areas PXs. The plurality of pixels PXs may be disposed in a matrix form which includes a plurality of pixel rows and a plurality of pixel columns. Each pixel area PX may include a first subpixel area PXa and a second subpixel area PXb. The first subpixel area PXa and the second subpixel area PXb may be vertically disposed, or arranged along a column direction.

An injection hole forming area V1 may be disposed between the first subpixel area PXa and the second subpixel area PXb to extend along a pixel row direction, and a barrier rib forming part V2 may be disposed between adjacent pixel columns.

The roof layer 360 is formed to extend along a pixel row direction. In this case, the roof layer 360 is removed from the injection hole forming area V1 and thus the injection hole forming area V1 is formed with an inlet 307 through which components positioned under the roof layer 360 may be exposed.

Each roof layer 360 is spaced apart from the plastic layer 130 between adjacent barrier rib forming parts V2, thereby forming a microcavity 305. Further, each roof layer 360 forms a barrier rib in the barrier rib forming part V2, and covers both sides of the microcavity 305.

A structure of the display device according to the exemplary embodiment of the present invention as described above is only an example and therefore may be changed while still falling within the bounds of embodiments of the invention. For example, the shapes of the pixel area PX, the injection hole forming area V1, and the barrier rib forming part V2 may be changed, the plurality of roof layers 360 may be connected to each other in the injection hole forming area V1, and a portion of each roof layer 360 is formed in the barrier rib forming part V2 while being spaced apart from the substrate 110 to connect between adjacent microcavities 305.

Next, one pixel of the display device according to the exemplary embodiment of the present invention will be described with reference to FIGS. 2 to 5.

Figure 3:
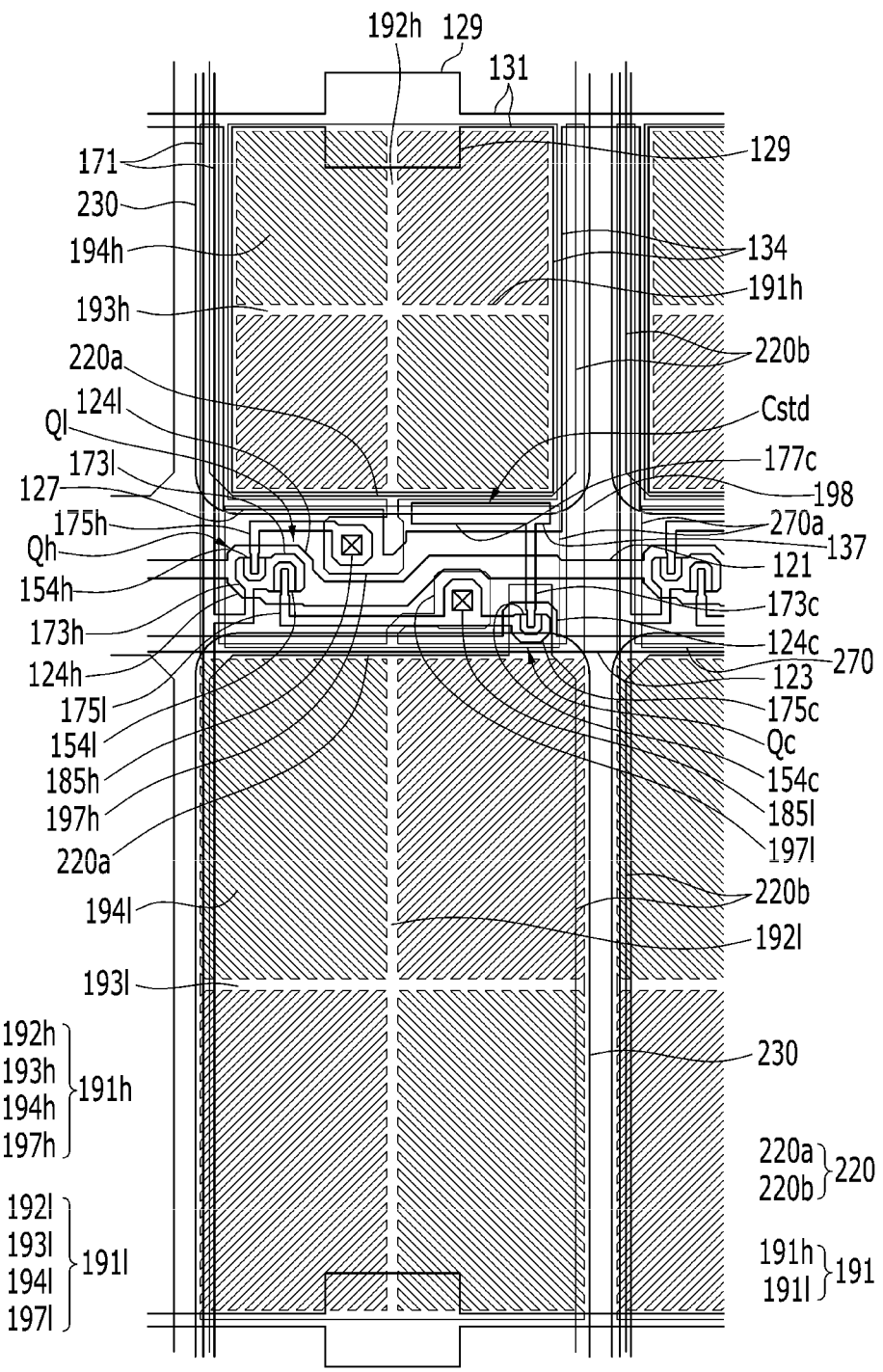
FIG. 3 is a plan view illustrating one pixel of the display device according to the exemplary embodiment of the present invention.
Figure 4:
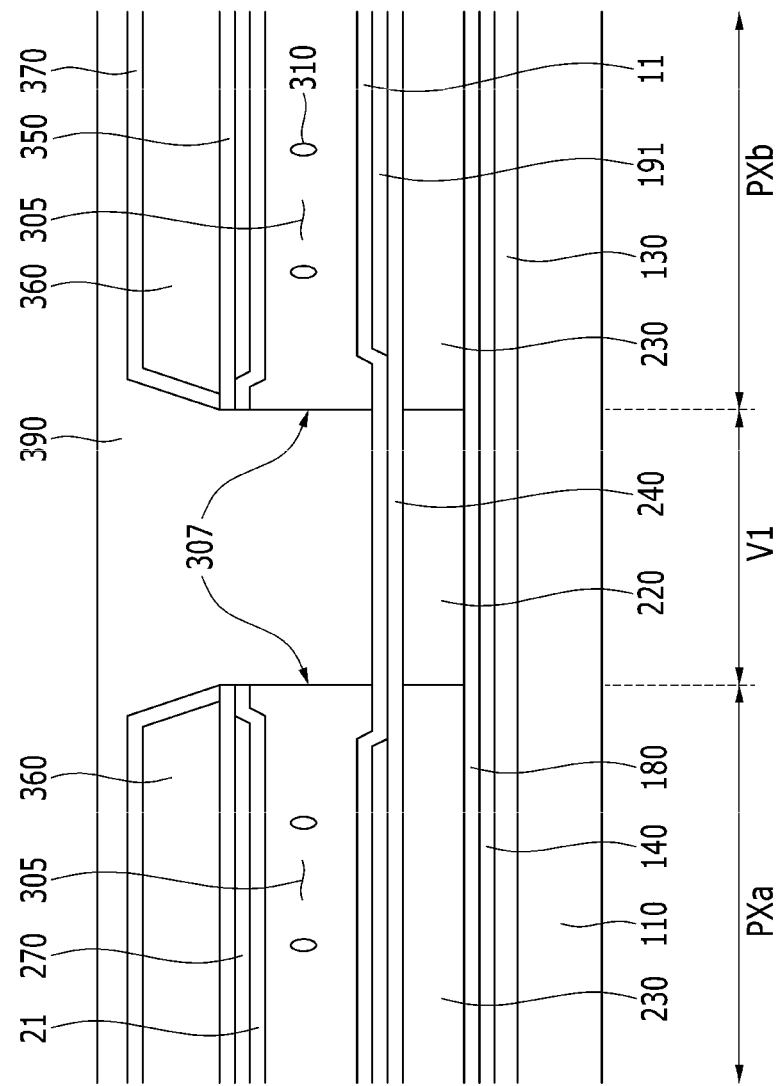
FIG. 4 is a cross-sectional view illustrating a portion of the display device according to the exemplary embodiment of the present invention and taken along the line III-III of FIG. 2.
Figure 5:
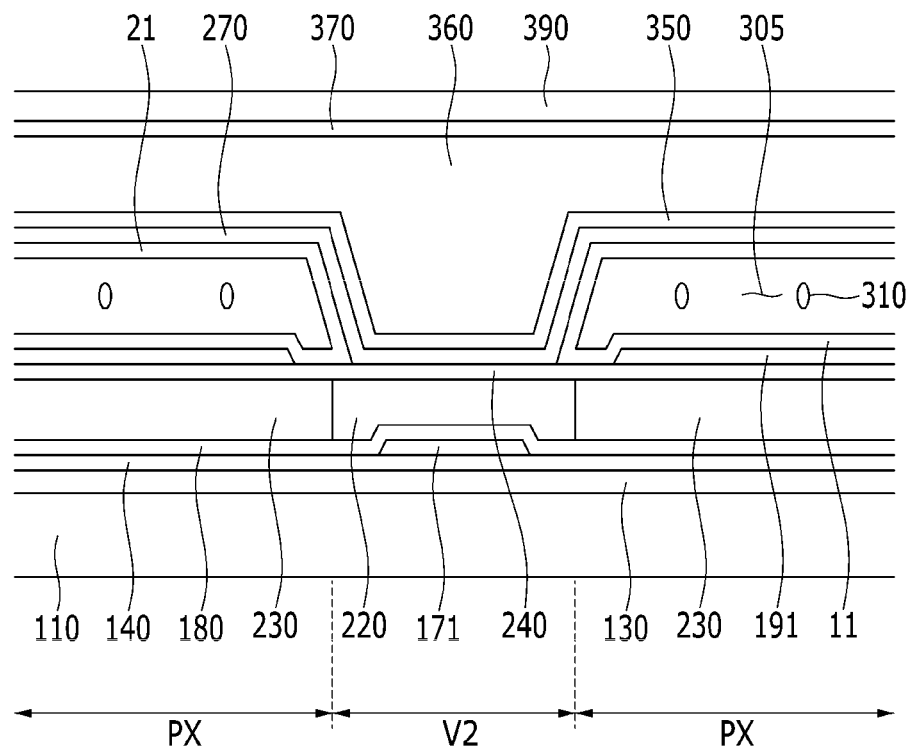
FIG. 5 is a cross-sectional view illustrating a portion of the display device according to the exemplary embodiment of the present invention and taken along the line IV-IV of FIG. 2.
Figure 6:
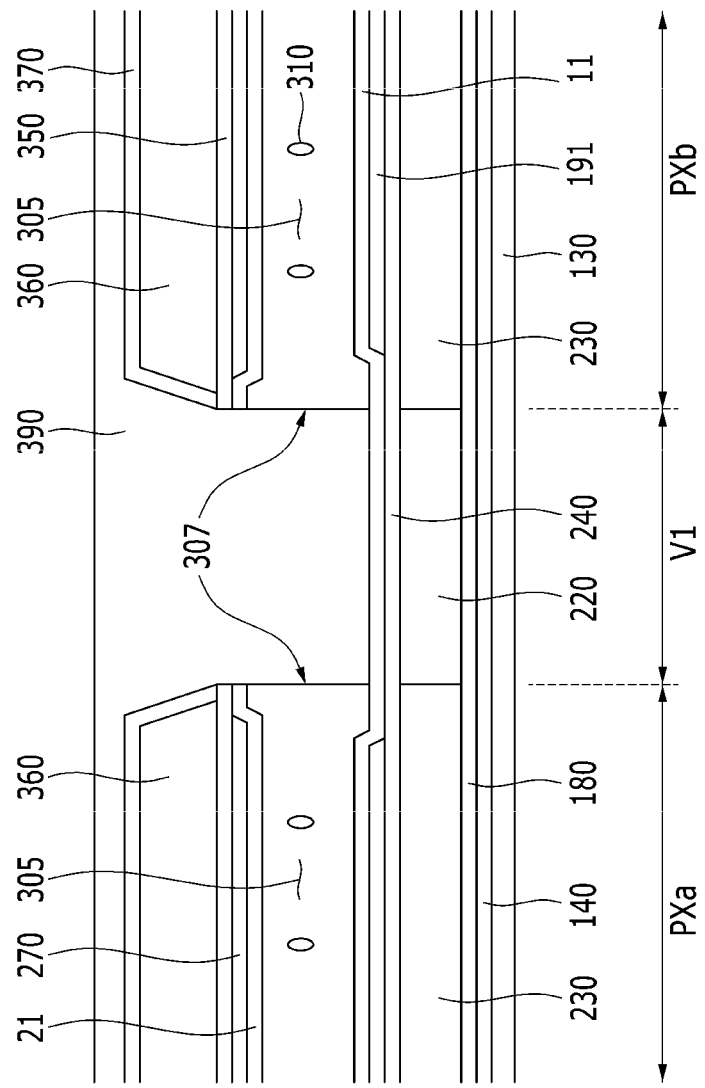
FIG. 6 is a cross-sectional view taken along the line VI-VI of FIG. 2.
Figure 7:
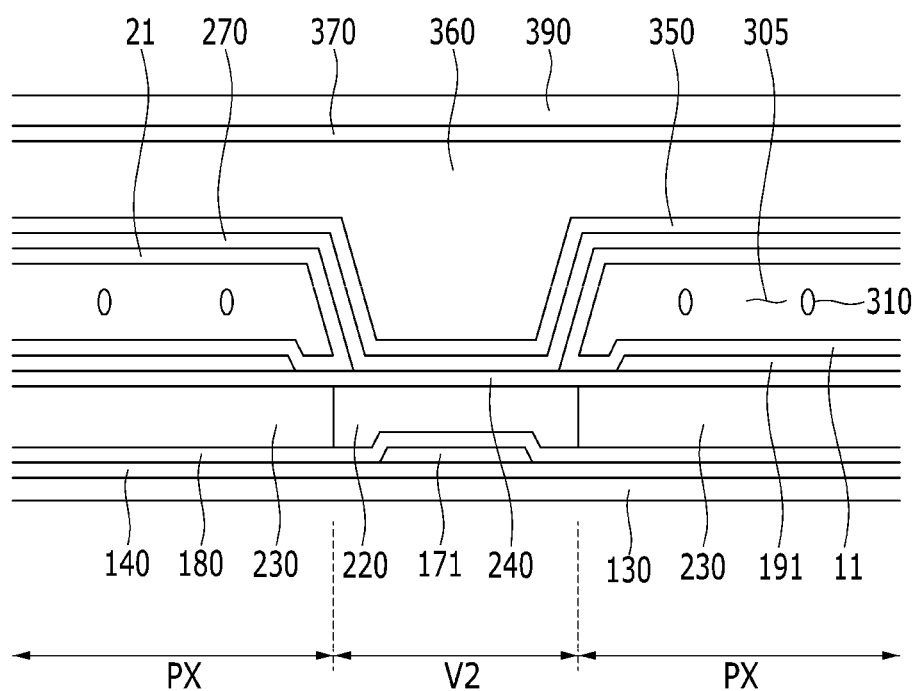
FIG. 7 is a cross-sectional view taken along the line VII-VII of FIG. 2.

FIG. 3 is a plan view illustrating one pixel of the display device according to the exemplary embodiment of the present invention, FIG. 4 is a cross-sectional view illustrating a portion of the display device according to the exemplary embodiment of the present invention and taken along the line of FIG. 2, and FIG. 5 is a cross-sectional view illustrating a portion of the display device according to the exemplary embodiment of the present invention and taken along the line IV-IV of FIG. 2. FIG. 6 is a cross-sectional view taken along the line VI-VI of FIG. 2 and FIG. 7 is a cross-sectional view taken along the line VII-VII of FIG. 2.

Referring to FIGS. 2 to 5, the plastic layer 130 is formed on the substrate 110. A plurality of gate conductors, which include a plurality of gate lines 121, a plurality of step down gate lines 123, and a plurality of sustain electrode lines 131, are formed on the plastic layer 130.

The gate line 121 and the step down gate line 123 mainly extend in a horizontal direction to transfer the gate signals. The gate conductors further include a first gate electrode 124h and second gate electrode 124l which protrude upward and downward from the gate line 121, and further includes a third gate electrode 124c which protrudes upward from the step down gate line 123. The first gate electrode 124h and the second gate electrode 124l are connected to each other to form one protrusion. In this case, the first, second and third gate electrode 124h, 124l, and 124c may be shaped in various ways without deviating from embodiments of the invention.

The sustain electrode line 131 mainly extends in the horizontal direction to transfer a defined voltage such as a common voltage Vcom. The sustain electrode line 131 includes a sustain electrode 129 which protrudes upward and downward from the line 131, a pair of vertical parts 134 which substantially vertically extends downward to the gate line 121, and a horizontal part 127 which connects tips of the pair of vertical parts 134 to each other.

A gate insulating layer 140 is formed on the gate conductors 121, 123, 124h, 124l, 124c, and 131. The gate insulating layer 140 may be made of one or more inorganic insulating materials such as silicon nitride (SiNx) and silicon oxide (SiOx). Further, the gate insulating layer 140 may be formed of a single layer or a multilayer.

A first semiconductor 154h, a second semiconductor 154l, and a third semiconductor 154c are formed on the gate insulating layer 140. The first semiconductor 154h may be positioned on a first gate electrode 124h, the second semiconductor 154l may be positioned on a second gate electrode 124l, and the third semiconductor 154c may be positioned on a third gate electrode 124c. The first semiconductor 154h and the second semiconductor 154l may be connected to each other, and if desired the second semiconductor 154l and the third semiconductor 154c may also be connected to each other. Further, the first semiconductor 154h may also be formed by extending below data lines 171. The first to third semiconductors 154h, 154l, and 154c may be made of amorphous silicon, polycrystalline silicon, metal oxide, and/or the like.

An ohmic contact (not illustrated) may be further formed on the first to third semiconductors 154h, 154l, and 154c. The ohmic contact (not illustrated) may be made of a material such as n+ hydrogenated amorphous silicon which is doped with silicide or n-type impurities at high concentration.

A data conductor which includes the data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal and mainly extends in a vertical direction to intersect, but be electrically insulated from, the gate line 121 and the step down gate lines 123. Each data line 171 includes the first source electrode 173h and the second source electrode 173l which extend toward the first gate electrode 124h and the second gate electrode 124l and are connected to each other.

The first drain electrode 175h, the second drain electrode 175l, and the third drain electrode 175c include a wide tip or end portion and another tip or end portion having a bar shape. The bar-shaped tip portions of the first drain electrode 175h and the second drain electrode 175l are partially enclosed by the first source electrode 173h and the second source electrode 173l. The wide end of the second drain electrode 175l may again extend to form the third source electrode 173c which is bent in a 'U'-shape. A wide tip portion 177c of the third drain electrode 175c overlaps the capacitive electrode 137 to form a step down capacitor Cstd and the bar-shaped tip portion thereof is partially enclosed by the third source electrode 173c.

The first gate electrode 124h, the first source electrode 173h, and the first drain electrode 175h form a first thin film transistor Qh along with the first semiconductor 154h. Likewise, the second gate electrode 124l, the second source electrode 173l, and the second drain electrode 175l form a second thin film transistor Ql along with the second semiconductor 154l. Similarly, the third gate electrode 124c, third source electrode 173c, and third drain electrode 175c form a third thin film transistor Qc along with the third semiconductor 154c.

The first semiconductor 154h, the second semiconductor 154l, and the third semiconductor 154c may be connected to one another to form a generally linear shape and may have substantially the same shape in plan view as the data conductors 171, 173h, 173l, 173c, 175h, 175l, and 175c and the ohmic contacts thereunder, except for a channel area between the source electrodes 173h, 173l, and 173c and the drain electrodes 175h, 175l, and 175c.

The first semiconductor 154h has a portion which is exposed between and by the first source electrode 173h and the first drain electrode 175h, the second semiconductor 154l has a portion which is exposed between and by the second source electrode 173l and the second drain electrode 175l, and the third semiconductor 154c has a portion which is exposed between and by the third source electrode 173c and the third drain electrode 175c.

A passivation layer 180 is formed on the exposed portions of semiconductors 154h, 154l, and 154c, each source electrode 173h/173l/173c, and each drain electrode 175h/175l/175c. The passivation layer 180 may be made of an organic insulating material or an inorganic insulating material, and may be formed of a single layer or a multilayer.

The color filters 230 are formed on the passivation layer 180, in each of the pixel areas PXs. Each color filter 230 may display one primary color such as one of the three primary colors red, green, and blue. The color filter 230 is not limited to these primary colors though, and may alternatively display cyan, magenta, yellow, white-based colors, and the like. Differently from that which is illustrated here, the color filter 230 may extend in a column direction along a gap between adjacent data lines 171.

A light blocking member 220 is formed in the area between adjacent color filters 230. The light blocking member 220 may be formed at a boundary between the pixel area PX and its thin film transistor, to prevent light leakage. The color filters 230 may be formed in the first subpixel area PXa and the second subpixel area PXb respectively, and the light blocking members 220 may be formed between the first subpixel area PXa and the second subpixel area PXb.

The light blocking member 220 includes a horizontal light blocking member 220a which extends along the gate line 121 and the step down gate line 123, and covers an area in which the first thin film transistor Qh, the second thin film transistor Ql, the third thin film transistor Qc, and the like are positioned. The light blocking member 220 also includes a vertical light blocking member 220b which extends along the data line 171. That is, the horizontal light blocking member 220a may be formed in the injection hole forming area V1, and the vertical light blocking member 220b may be formed in the barrier rib forming part V2. The color filter 230 and the light blocking member 220 may overlap each other in some areas. The vertical light blocking member 220b may also be omitted.

The first insulating layer 240 may be further formed on the color filter 230 and the light blocking member 220. The first insulating layer 240 may be made of inorganic insulating materials such as silicon nitride (SiNx), silicon oxide (SiOx), and/or silicon nitride oxide (SiOxNy). The first insulating layer 240 serves to protect color filters 230 made of organic material, and the light blocking member 220, and may also be omitted if necessary.

The first insulating layer 240, the light blocking member 220, and the passivation layer 180 are provided with a plurality of first contact holes 185h and a plurality of second contact holes 185l which expose the wide tip portion of the first drain electrodes 175h and the wide tip portion of the second drain electrodes 175l, respectively.

A pixel electrode 191 is formed on the first insulating layer 240. The pixel electrode 191 may be made of transparent metal materials such as indium tin oxide (ITO) and indium zinc oxide (IZO).

The pixel electrode 191 includes a first subpixel electrode 191h and a second subpixel electrode 191l which are separated from each other, having the gate line 121 and the step down gate line 123 disposed therebetween. The two subpixel electrodes 191h and 191l are respectively disposed over and under the gate line 121 and the step down gate line 123 and adjacent to each other in a column direction. That is, the first subpixel electrode 191h and the second subpixel electrode 191l are separated from each other with an injection hole forming area V1 disposed therebetween, and the first subpixel electrode 191h is positioned in the first subpixel area PXa while the second subpixel electrode 191l is positioned in the second subpixel area PXb.

The first subpixel electrode 191h and the second subpixel electrode 191l are respectively connected to the first drain electrode 175h and the second drain electrode 175l through the first contact hole 185h and the second contact hole 185l. Therefore, when the first thin film transistor Qh and the second thin film transistor Ql are in a turned-on state, the first subpixel electrode 191h and the second subpixel electrode 191l receive a data voltage from the first drain electrode 175h and the second drain electrode 175l.

The first subpixel electrode 191h and the second subpixel electrode 191l each have an overall shape that is a quadrangle, and each of the first subpixel electrode 191h and the second subpixel electrode 191l includes a cruciform stem part. The cruciform stem parts have horizontal stem parts 193h and 193l, and vertical stem parts 192h and 192l intersecting the horizontal stem parts 193h and 193l. Further, the first subpixel electrode 191h and the second subpixel electrode 191l include a plurality of fine branch parts 194h and 194l and protrusions 197h and 197l which protrude downward or upward from edges of the subpixel electrodes 191h and 191l.

The first subpixel electrode 191h and the second subpixel electrode 191l are each divided into four sub-areas by the horizontal stem parts 193h and 193l and the vertical stem parts 192h and 192l. The fine branch parts 194h and 194l obliquely extend from the horizontal stem parts 193h and 193l and the vertical stem parts 192h and 192l, and their directions of extension may form an angle of approximately 45° or 135° with respect to the gate line 121 or the horizontal stem parts 193h and 193l. Further, directions in which the fine branch parts 194h and 194l of the two adjacent sub-areas extend may be orthogonal to each other.

The first subpixel electrode 191h further includes an outside stem part which encloses an outer edge of electrode 191h. The second subpixel electrode 191l further includes horizontal parts which are positioned at an upper portion and a lower portion thereof, and left and right vertical parts 198 which are positioned at the left and right of the first subpixel electrode 191h. The left and right vertical parts 198 may prevent capacitive coupling, or coupling between the data line 171 and the first subpixel electrode 191h.

The shape of the pixel area, the structure of the thin film transistor, and the shape of the pixel electrode, which are described above, are only one example, and therefore the present invention is not limited thereto and may be altered in various ways.

A common electrode 270 is formed on the pixel electrode 191, while being spaced apart from the pixel electrode 191 at a predetermined distance. A microcavity 305 is formed between the pixel electrode 191 and the common electrode

270. That is, the microcavity 305 is bounded by the pixel electrode 191 and the common electrode 270. A width of the microcavity 305 may have any suitable value, depending for instance on a size and resolution of the display device.

The common electrode 270 may be made of transparent metal materials such as indium tin oxide (ITO) and indium zinc oxide (IZO). The common electrode 270 may have a constant voltage applied thereto, and an electric field may thus be formed between the pixel electrode 191 and the common electrode 270.

A first alignment layer 11 is formed on the pixel electrode 191. The first alignment layer 11 may also be formed just on the portion of first insulating layer 240 which is not covered by the pixel electrode 191.

A second alignment layer 21 is formed under the common electrode 270 to face the first alignment layer 11.

The first alignment layer 11 and the second alignment layer 21 may be formed of a vertical alignment layer and may be made of an alignment material such as polyamic acid, polysiloxane, and polyimide. The first and second alignment layers 11 and 21 may be connected to each other at an edge of the pixel area PX.

The liquid crystal layer, formed of liquid crystal molecules 310, is formed in the microcavity 305 which is disposed between the pixel electrode 191 and the common electrode 270. The liquid crystal molecules 310 have a negative dielectric anisotropy and may be aligned perpendicular to the substrate 110 in the state in which no electric field is applied to the liquid crystal molecules. That is, a vertical alignment may be formed.

The first subpixel electrode 191*h* and the second subpixel electrode 191*l* each receive the data voltage to generate the electric field along with the common electrode 270, thereby determining the direction of the liquid crystal molecules 310 which are located in the microcavity 305 between the two electrodes 191 and 270. A luminance of light transmitted through the liquid crystal layer varies depending on the determined direction of the liquid crystal molecules 310.

A second insulating layer 350 may be further formed on the common electrode 270. The second insulating layer 350 may be made of inorganic insulating materials such as silicon nitride (SiNx), silicon oxide (SiOx), and silicon nitride oxide (SiOxNy), and may be omitted if desired.

The roof layer 360 is formed on the second insulating layer 350. The roof layer 360 may be made of an organic material. The microcavity 305 is formed under the roof layer 360, and the roof layer 360 is hardened by a hardening process to keep the shape of the microcavity 305. That is, the roof layer 360 is formed to be spaced apart from the pixel electrode 191, having the microcavity 305 disposed therebetween.

The roof layers 360 are positioned in each pixel area PX and the barrier rib forming part V2 along the corresponding pixel row, and are not formed in the injection hole forming area V1. That is, the roof layer 360 is not formed between the first subpixel area PXa and the second subpixel area PXb. The microcavities 305 are formed under each roof layer 360, in the first subpixel area PXa and the second subpixel area PXb, respectively. The microcavity 305 is not formed in the barrier rib forming part V2. Therefore, a thickness of the roof layer 360 positioned in the barrier rib forming part V2 may be formed to be larger than that of the roof layers 360 positioned in the first subpixel area PXa and the second subpixel area PXb, respectively. An upper surface and both sides of the microcavity 305 are formed to be covered by the roof layer 360.

The common electrode 270, the second insulating layer 350, and the roof layer 360 are provided with inlets 307 through which a portion of the microcavity 305 is exposed. The inlets 307 may be formed to face each other at edges of the first subpixel area PXa and the second subpixel area PXb. That is, the inlets 307 may be formed to expose sides of the microcavity 305 corresponding to a lower side of the first subpixel area PXa and an upper side of the second subpixel area PXb. Since the interior of microcavity 305 is exposed by the inlet 307, an aligning agent, the liquid crystal material, or the like may be injected into the microcavity 305 through the inlet 307.

A third insulating layer 370 may be further formed on the roof layer 360. The third insulating layer 370 may be made of inorganic insulating materials such as silicon nitride (SiNx), silicon oxide (SiOx), and silicon nitride oxide (SiOxNy). The third insulating layer 370 may be formed to cover the upper surface and the sides of the roof layer 360. The third insulating layer 370 serves to protect the roof layer 360 which is made of organic material.

Here, the third insulating layer 370 is formed on the roof layer 360, but the present invention is not limited thereto and therefore the third insulating layer 370 may also be omitted if desired.

An overcoat 390 may be formed on the third insulating layer 370. The overcoat 390 is formed to cover and seal the inlet 307. That is, the overcoat 390 may encapsulate the microcavity 305 to prevent the liquid crystal molecules 310 which is formed in the microcavity 305 from leaking out. The overcoat 390 contacts the liquid crystal molecules 310, and therefore may be made of a material which does not react with the liquid crystal molecules 310. For example, the overcoat 390 may be made of parylene, and the like.

The overcoat 390 may also be made of a multilayer such as a double layer or a triple layer. The double layer may be formed of two layers which are made of different materials. The triple layer is formed of three layers, in which materials of adjacent layers are different from each other. For example, the overcoat 390 may include a layer made of the organic insulating material and a layer made of the inorganic insulating material.

Polarizers may be further formed on the upper and lower surfaces of the display device. The polarizer may be formed of a lower polarizer 510 and an upper polarizer 520. The lower polarizer 510 may be attached beneath the substrate 110 and the exposed plastic layer 130, and the upper polarizer 520 may be attached on the overcoat 390.

However, referring to FIGS. 6 and 7, the substrate 110 is not present under the pixels positioned in the flexible part. That is, only the plastic layer 130 is present thereunder, and the foregoing structure is identically stacked over the plastic layer 130.

As described above, in a display device according to the exemplary embodiment of the present invention, the substrate 110 is formed only in some areas under the display device, and the plastic layer 130 is exposed in the areas in which the substrate is not formed. Further, microcavities 305 are formed on the plastic layer 130, in each pixel. The liquid crystal layer is formed in each microcavity 305. Therefore, in the case of the display device, the flexible part B in which the substrate is not formed is freely bent or rolled, and thus may be freely shaped as desired for various applications.

That is, the display device is formed as a single substrate structure in which both the pixel electrode and the common electrode are formed, having the microcavity disposed therebetween. In this configuration, the single substrate is divided into fixed part A in which the substrate is formed, and flexible part B which is not provided with the substrate and which is supported only by the plastic layer 130. Therefore, the flexible part B may go through deformations such as folding and bending, but the shape of the display device may be maintained by the fixed part A. Further, the lower portion of the fixed part A is provided with a hard substrate, and therefore the module process and the like may be more easily performed. The connection with the external driving unit may be performed in the area of the fixed part A.

Hereinafter, a method of manufacturing a display device according to an exemplary embodiment of the present invention will be described with reference to the drawings. FIGS. 8A to 8F are process diagrams illustrating a method of manufacturing a display device according to an exemplary embodiment of the present invention.

Referring to FIGS. 8A to 8F, a substrate 110 is prepared and then the plastic layer 130 is formed over substantially the whole of the substrate 110. In this case, the substrate 110 may be a glass substrate. Further, the plastic layer 130 may be polyimide.

Next, a thin film transistor layer 400 including the microcavity, the pixel electrode, the common electrode, and the like is formed on the plastic layer 130. The forming of the thin film transistor layer 400 will be described below.

Next, the upper polarizer 520 is attached on the thin film transistor layer 400.

Next, some areas of the substrate 110 are removed. In this case, removal may be performed by using a laser, and the like. A portion of the plastic layer 130 is exposed while a portion of the substrate 110 is removed.

Next, the lower polarizer 510 is attached on the substrate 110 and the exposed plastic layer 130.

Next, a module connecting part 600, connected to the driving unit, is attached. In this case, the module connecting part 600 is attached to the fixed part A in which the substrate 110 is present.

The substrate 110 is present in the lower portion of the area of the fixed part A and therefore the fixed part A is more rigid than area B, such that the fixed part A may bear a pressure, and the like, applied at the time of attaching the module connecting part 600 and the module connection part 600 may be firmly attached.

Hereinafter, a method of manufacturing a display device according to the exemplary embodiment of the present invention will be described in detail with reference to the accompanying drawings.

FIGS. 9 to 23 are process cross-sectional views of a method of manufacturing a display device according to the exemplary embodiment of the present invention.

Figure 9:
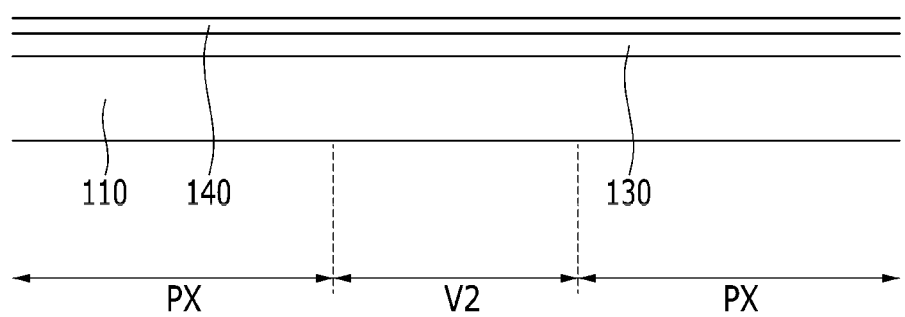
FIG. 9 to FIG. 23 are process cross-sectional views of the method of manufacturing a display device according to an exemplary embodiment of the present invention.

As illustrated in FIG. 9, plastic layer 130 is formed on the substrate 110 which is made of glass or the like. Next, the gate line 121 and the step down gate line 123, which extend in the same direction, are formed on the plastic layer 130. The first gate electrode 124h, the second gate electrode 124l, and the third gate electrode 124c, which protrude from the gate line 121, are formed thereon.

Further, the gate line 121, the step down gate line 123, and the sustain electrode line 131, spaced apart from the first to third gate electrodes 124h, 124l, and 124c, may be formed together.

Next, the gate insulating layer 140, which can be made of inorganic insulating materials such as silicon oxide (SiOx) or silicon nitride (SiNx), is formed on substantially the entire surface of the substrate 110, which includes the gate line 121, the step down gate line 123, the first to third gate electrode 124h, 124l, and 124c, and the sustain electrode line 131. The gate insulating layer 140 may be formed of a single layer or a multilayer.

Next, semiconductor materials, such as amorphous silicon, polycrystalline silicon, and metal oxide, are deposited on the gate insulating layer 140 and then are patterned, thereby forming the first semiconductor 154h, the second semiconductor 154l, and the third semiconductor 154c. The first semiconductor 154h may be formed to be positioned on the first gate electrode 124h, the second semiconductor 154l may be formed to be positioned on the second gate electrode 124l, and the third semiconductor 154c may be formed to be positioned on the third gate electrode 124c.

Figure 10:
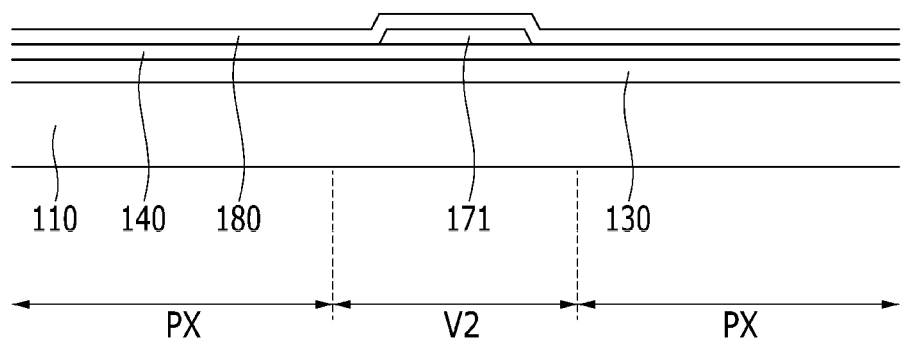

Next, referring to FIG. 10, the metal material is deposited and then patterned, thereby forming the data line 171 which extends in a direction generally perpendicular to the gate line 121 and step down gate line 123. The metal material may be formed of a single layer or a multilayer.

Further, the first source electrode 173h which protrudes over the first gate electrode 124h from the data line 171, and the first drain electrode 175h which is spaced apart from the first source electrode 173h, are formed together. Further, the second source electrode 173l which is connected to the first source electrode 173h, and the second drain electrode 175l which is spaced apart from the second source electrode 173l, are formed together. Further, the third source electrode 173c which extends from the second drain electrode 175l, and the third drain electrode 175c which is spaced apart from the third source electrode 173c, are formed together.

The semiconductor material and the metal material are continuously deposited and then simultaneously patterned, thereby forming the first to third semiconductors 154h, 154l, and 154c, the data line 171, the first to third source electrodes 173h, 173l, and 173c, and the first to third drain electrodes 175h, 175l, and 175c.

The first/second/third gate electrodes 124h/124l/124c, the first/second/third source electrodes 173h/173l/173c, and the first/second/third drain electrodes 175h/175l/175c respectively form the first/second/third thin film transistors (TFTs) Qh/Ql/Qc along with the first/second/third semiconductors 154h/154l/154c.

Next, the passivation layer 180 is formed on the data line 171, the first to third source electrodes 173h, 173l, and 173c, the first to third drain electrodes 175h, 175l, and 175c, and the semiconductors 154h, 154l, and 154c which are exposed between each source electrode 173h/173l/173c and each drain electrode 175h/175l/175c. The passivation layer 180 may be made of an organic insulating material or an inorganic insulating material and may be formed of a single layer or a multilayer.

Figure 11:
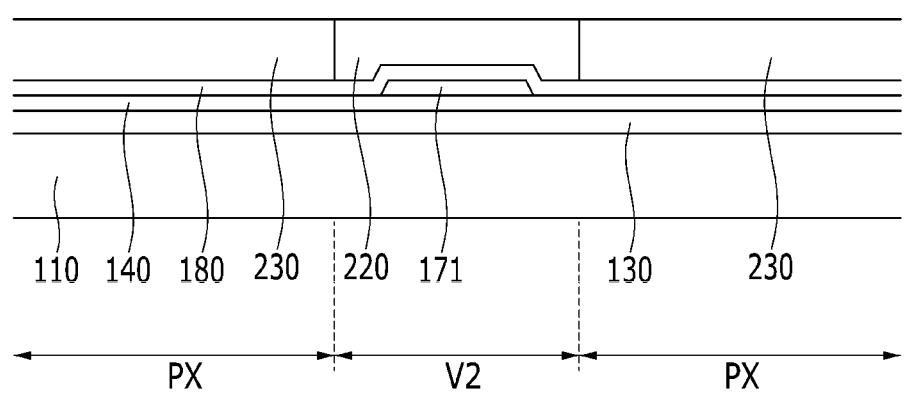

Next, referring to FIG. 11, the color filters 230 are formed on the passivation layers 180, in each pixel area PX. The color filters 230 are formed in/on both the first subpixel area PXa and the second subpixel area PXb, and may not be formed in the injection hole forming area V1. Further, color filters 230 having the same color may be formed along the column direction of the plurality of pixel areas PXs. In the case of color filters 230 having three colors, a color filter 230 of a first color is first formed, and then a mask is shifted to form a color filter 230 having a second color. Once the color filter 230 having a second color is formed, the mask is shifted again, to form the color filter 230 having a third color.

Next, the boundary part of each pixel area PX is formed on the passivation layer 180, by forming the light blocking member 220 on the thin film transistor and around the perimeter of pixel areas PXs. The light blocking member 220 may also be formed even in the injection hole forming area V1 which is positioned between the first subpixel area PXa and the second subpixel area PXb.

In the present embodiment, the color filter 230 is formed and then the light blocking member 220 is formed as described above. However, various other embodiments are not limited thereto. For example, the light blocking member 220 may be first formed and then the color filter 230 may be formed after that.

Further, the vertical light blocking member 220b may also be omitted.

Figure 12:
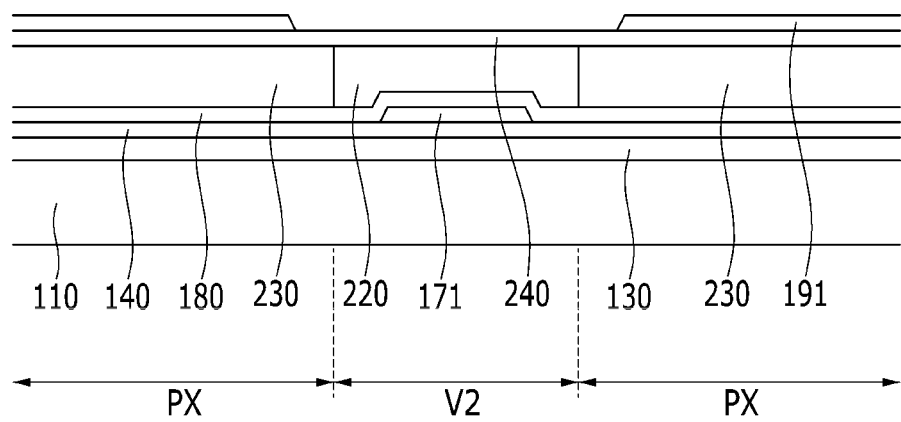

Next, referring to FIG. 12, the first insulating layer 240, which is made of inorganic insulating materials such as silicon nitride (SiNx), silicon oxide (SiOx) and silicon nitride oxide (SiOxNy), is formed on the color filter 230 and the light blocking member 220.

Next, the passivation layer 180, the light blocking member 220, and the first insulating layer 240 are etched to form both the first contact hole 185h through which a portion of the first drain electrode 175h is exposed, and the second contact hole 185l through which a portion of the second drain electrode 175l is exposed.

Next, transparent metal materials such as indium tin oxide (ITO) and indium zinc oxide (IZO) are deposited on the first insulating layer 240 and then patterned to form the first subpixel electrode 191h in the first subpixel area PXa, and to form the second subpixel electrode 191l in the second subpixel area PXb. The first subpixel electrode 191h and the second subpixel electrode 191l are separated from each other, having the injection hole forming area V1 disposed therebetween. The first subpixel electrode 191h is formed to be connected to the first drain electrode 175h through the first contact hole 181h, and the second subpixel electrode 191l is formed to be connected to the second drain electrode 175l through the second contact hole 185l.

The first subpixel electrode 191h and the second subpixel electrode 191l are each formed with the horizontal stem parts 193h and 193l and the vertical stem parts 192h and 192l which intersect the horizontal stem parts 193h and 193l. The subpixel electrodes 191h and 191l also include the plurality of fine branch parts 194h and 194l which obliquely extend from the horizontal stem parts 193h and 193l and the vertical stem parts 192h and 192l.

Figure 13:
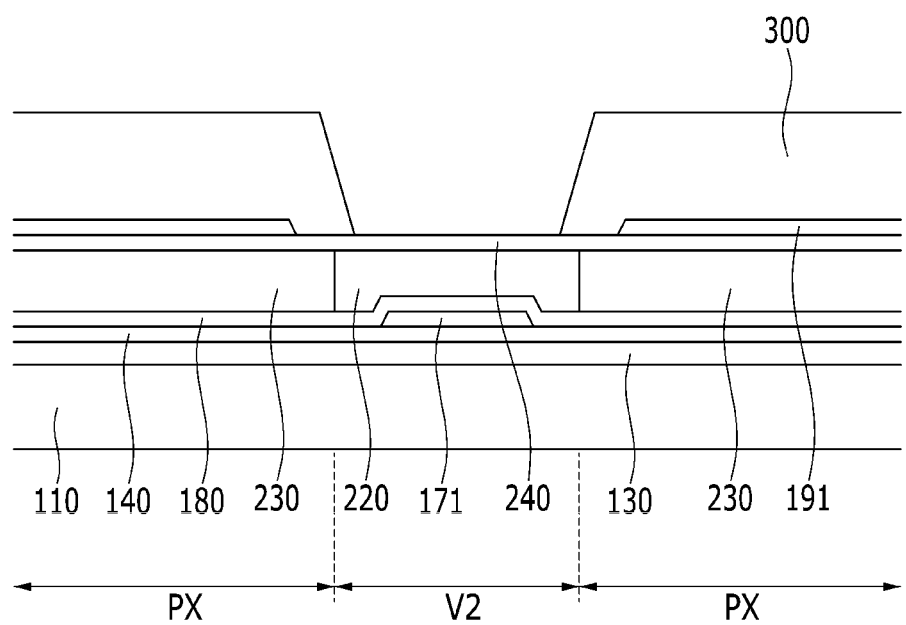

As illustrated in FIG. 13, a photosensitive organic material is coated on the pixel electrode 191 and a sacrificial layer 300 is formed by a photo process performed on this photosensitive organic material. The sacrificial layer 300 is preferably made of a positive photosensitive material.

The sacrificial layers 300 are formed to be connected to each other along the plurality of pixel columns. That is, the sacrificial layer 300 is formed to cover each pixel area PX and is also formed to cover the injection hole forming area V1 which is positioned between the first subpixel area PXa and the successive second subpixel area PXb. However, the sacrificial layer is removed by the photo process, and thus is not present, on the barrier rib forming part V2.

Figure 14:
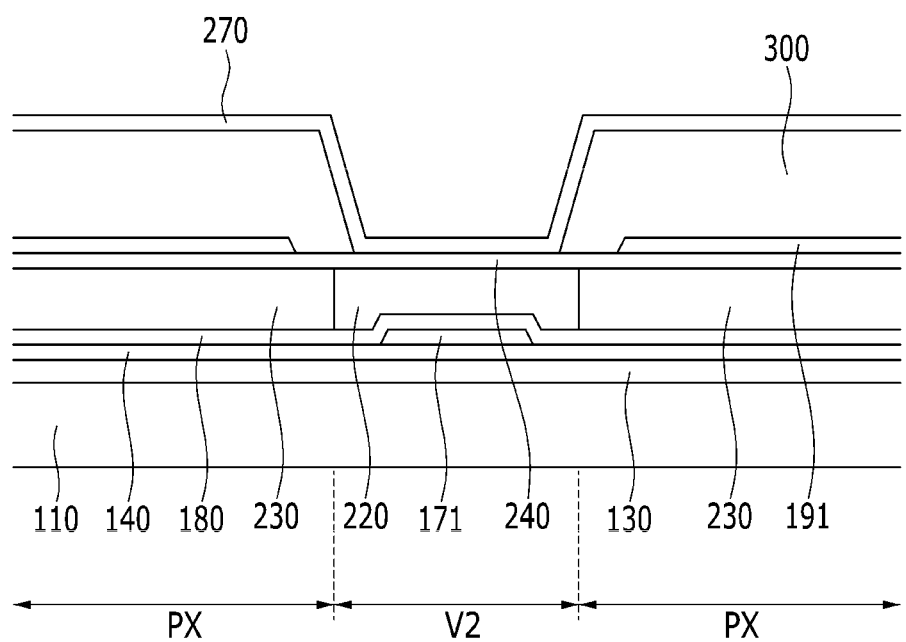

Next, as illustrated in FIG. 14, one or more transparent metal materials, such as indium tin oxide (ITO) and indium zinc oxide (IZO), are deposited on the sacrificial layer 300 to form the common electrode 270.

Figure 15:
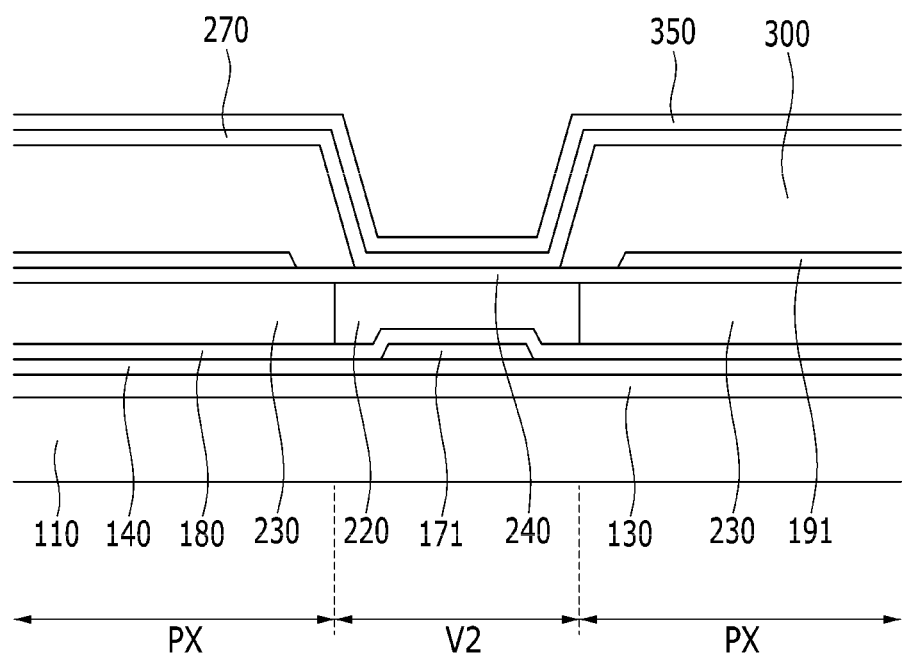

Next, as illustrated in FIG. 15, the second insulating layer 350, which is made of inorganic insulating materials such as silicon nitride (SiNx), silicon oxide (SiOx), and silicon nitride oxide (SiOxNy), is formed on the common electrode 270.

Figure 16:
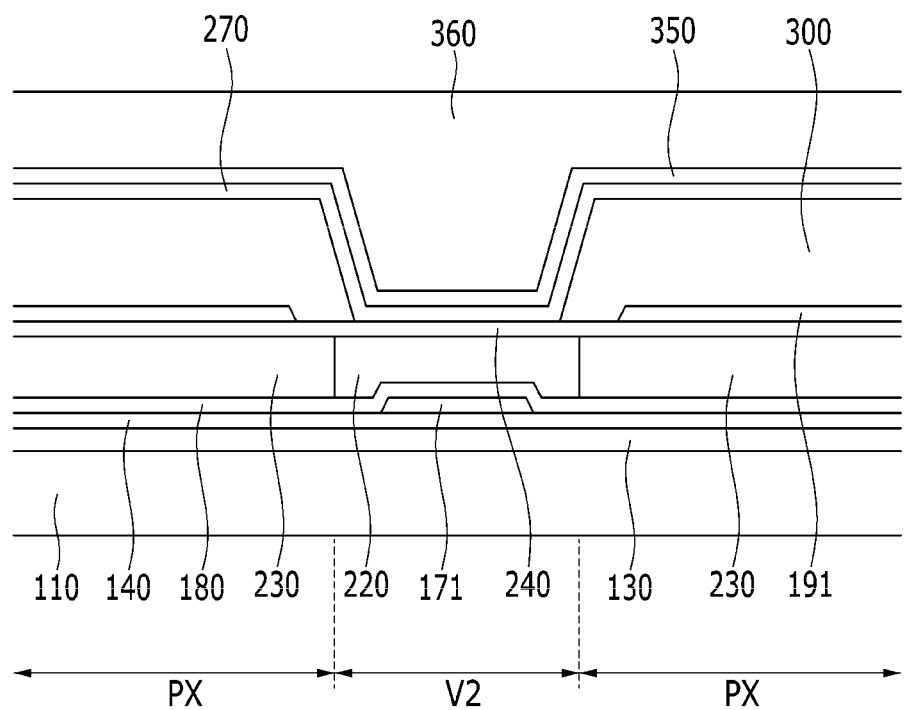

Next, as illustrated in FIG. 16, organic material is coated on the second insulating layer 350 and is patterned to form the roof layer 360. In this case, the organic material positioned in the injection hole forming area V1 may be patterned to be removed. The area of the patterned roof layer serves as the liquid crystal injection hole later. Therefore, the roof layer 360 is formed to be connected along a plurality of pixel rows.

Figure 17:
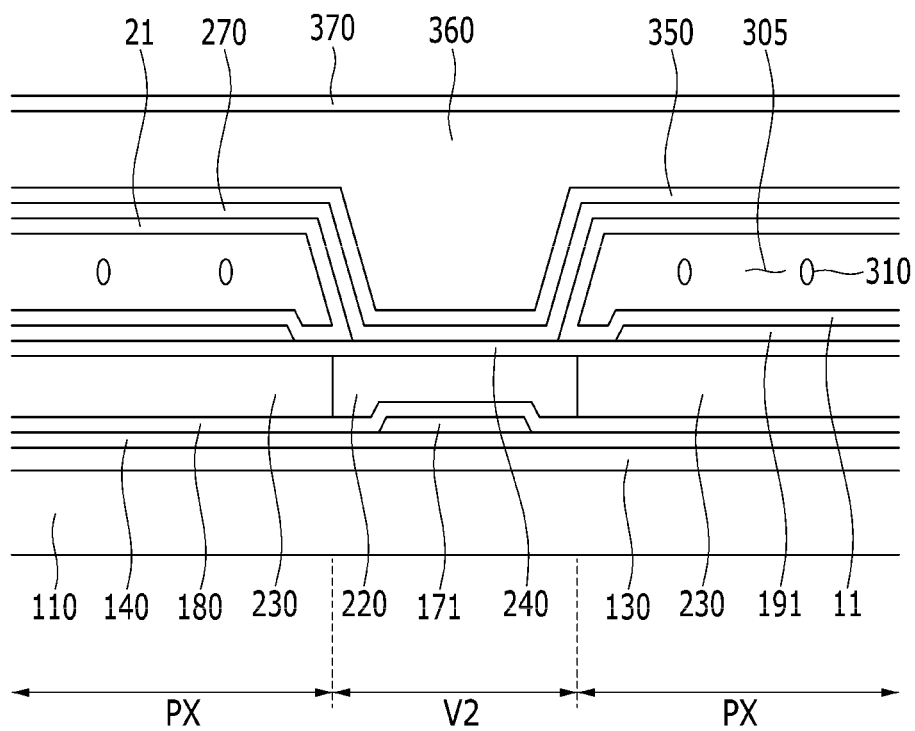

Next, as illustrated in FIG. 17, the third insulating layer 370, which is made of inorganic insulating materials such as silicon nitride (SiNx), silicon oxide (SiOx) and the like, may be formed on the roof layer 360. The third insulating layer 370 is formed on the patterned roof layer 360 and therefore may cover the side of the roof layer 360 to protect the roof layer 360.

Figure 18:
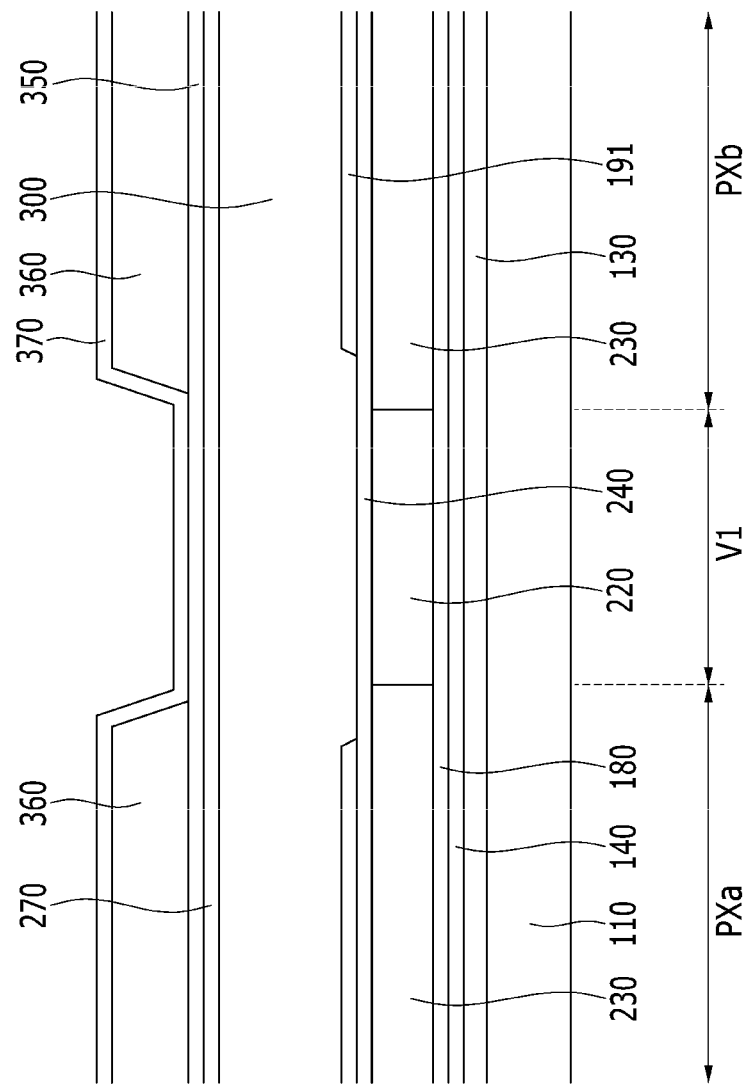

FIG. 18 illustrates another cross section of a display device which is manufactured by steps illustrated in FIG. 16. FIG. 18 illustrates crossing cross section of an area of the injection hole forming area V1, that is, the same cross section as FIG. 4.

FIG. 17 illustrates a cross section cut through the barrier rib forming part V2, but for better comprehension and convenience of description, the cross section cutting through the area of the injection hole forming area V1 will be described.

Figure 19:
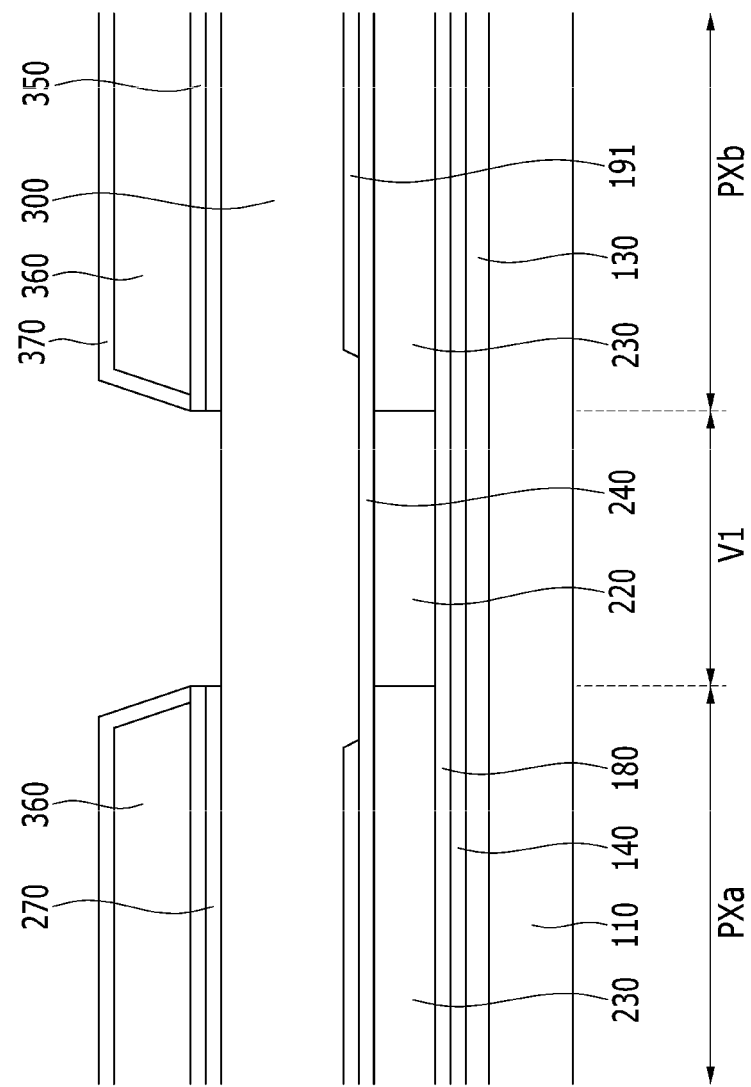

Next, referring to FIG. 19, the portions of the third insulating layer 370, the second insulating layer 350, and the common electrode 270 which are positioned in the injection hole forming area V1 are removed by patterning the third insulating layer 370, the second insulating layer 350, and the common electrode 270. As the third insulating layer 370, the second insulating layer 350, and the common electrode 270 are patterned, the sacrificial layer 300 which is positioned in the injection hole forming area V1 is exposed.

Figure 20:
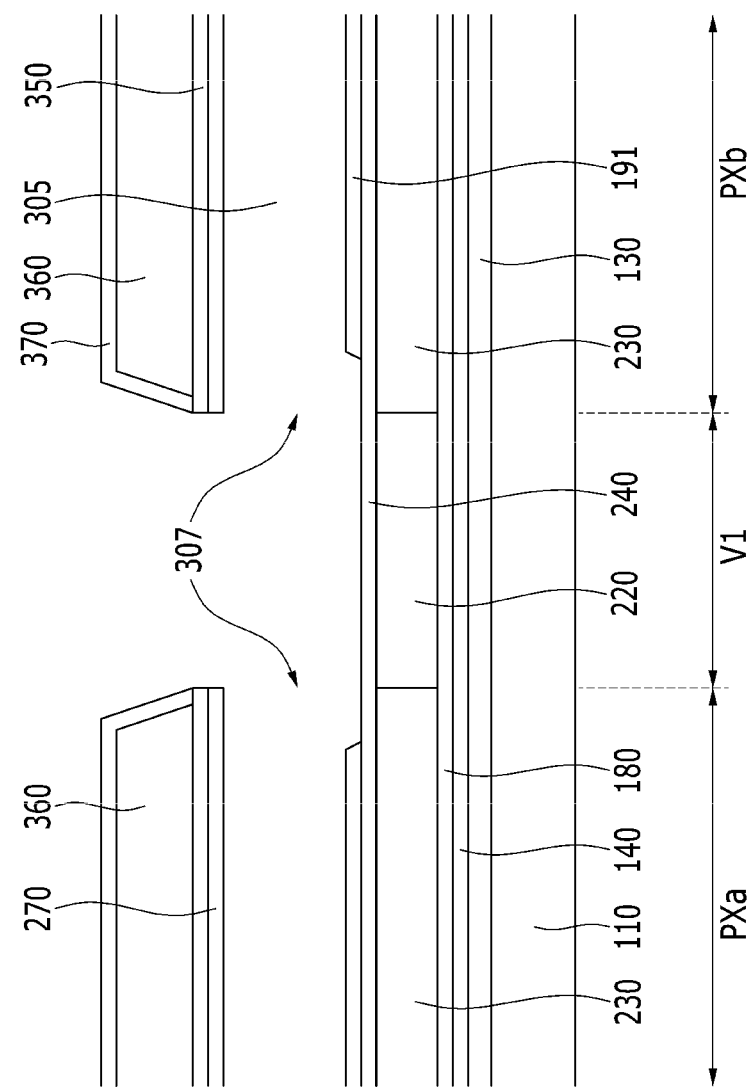

Next, referring to FIG. 20, the sacrificial layer 300 is ashed by supplying oxygen plasma to the substrate 110 on which the sacrificial layer 300 is exposed, or the whole surface of the sacrificial layer 300 is removed by supplying a developer. When the sacrificial layer 300 is removed, the microcavity 305 is generated in the space in which the sacrificial layer 300 was positioned.

The pixel electrode 191 and the common electrode 270 are spaced apart from each other, having the microcavity 305 disposed therebetween, and the pixel electrode 191 and the roof layer 360 are also spaced apart from each other, having the microcavity 305 disposed therebetween. The common electrode 270 and the roof layer 360 are formed to cover the upper surface and both sides of the microcavity 305.

The microcavity 305 is exposed through the portion where the roof layer 360 and the common electrode 270 are removed, which is called the liquid crystal inlet 307. The liquid crystal inlet 307 is formed along the injection hole forming area V1. Alternatively, the liquid crystal inlet 307 may be formed along the barrier rib forming part V2.

Next, heat is applied to the substrate 110 to harden the roof layer 360. This is to help the roof layer 360 maintain the shape of the microcavity 305.

Next, aligning agent including the aligning material is dropped on the substrate 110 by a spin coating method or an inkjet method, so that the aligning agent is injected into the microcavity 305 through the inlet 307. When a hardening process progresses after the aligning agent is injected into the microcavity 305, a solution ingredient is evaporated and the aligning material remains on the interior walls and surfaces of the microcavity 305.

In this manner, the first alignment layer 11 is formed on the pixel electrode 191 and the second alignment layer 21 may be formed under the common electrode 270. The first alignment layer 11 and the second alignment layer 21 are formed to face each other having the empty space of the microcavity 305 disposed therebetween, and are formed to be connected to each other at the edge of the pixel area PX.

In this case, the first and second alignment layers 11 and 21 may be aligned in the vertical direction from the substrate 110. In addition, a process of irradiating UV light upon the first and second alignment layers 11 and 21 is performed, and the first and second alignment layers 11 and 21 may thus be formed to be aligned in the horizontal direction from the substrate 110. Any alignment directions are contemplated for alignment layers 11 and 21.

Figure 21:
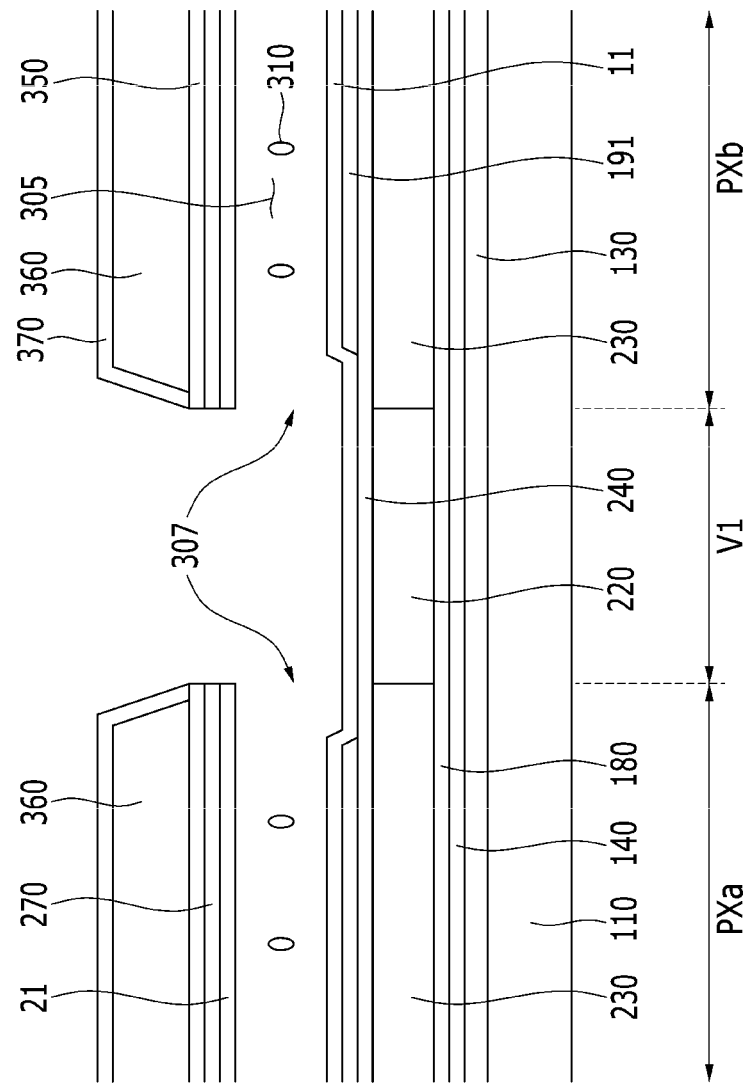

Next, referring to FIG. 21, when the liquid crystal material formed of the liquid crystal molecules 310 is dropped on the substrate 110 by an inkjet method or a dispensing method, the liquid crystal material is injected into the microcavity 305 through the inlet 307.

Figure 22:
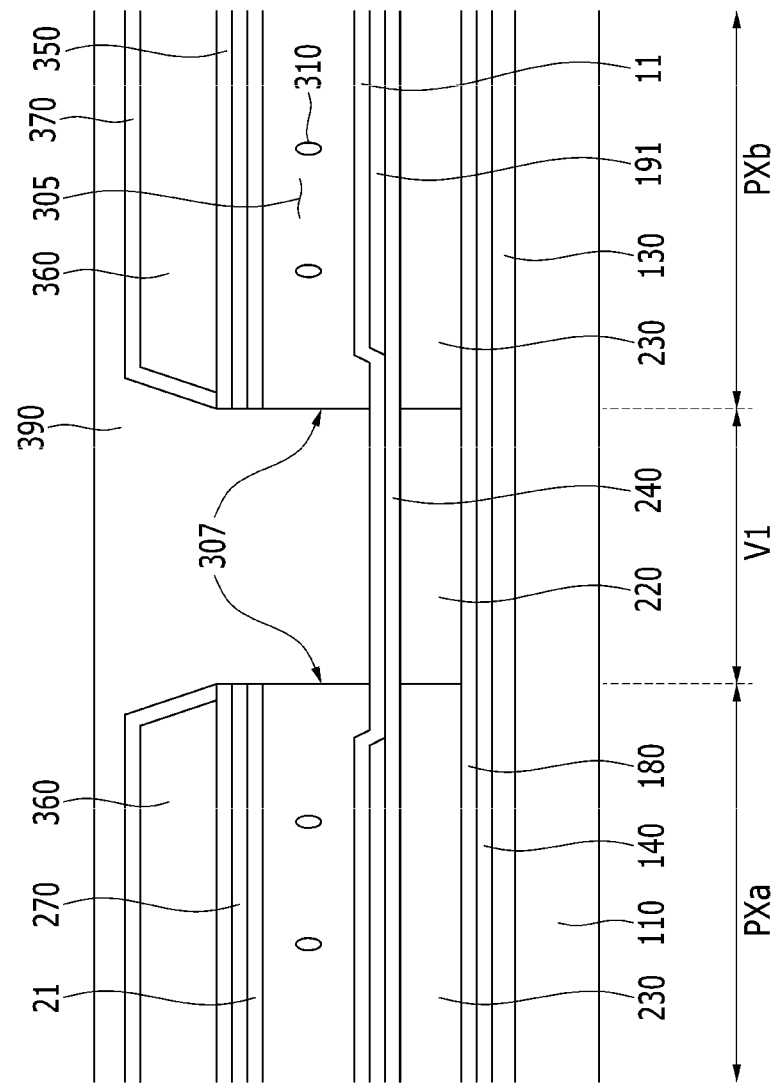

As illustrated in FIG. 22, a material which does not react to the liquid crystal molecules 310 is deposited on the third insulating layer 370 to form the overcoat 390. The overcoat 390 is formed to cover the inlet 307 through which the interior of the microcavity 305 is exposed, to thereby seal the microcavity 305.

Figure 23:
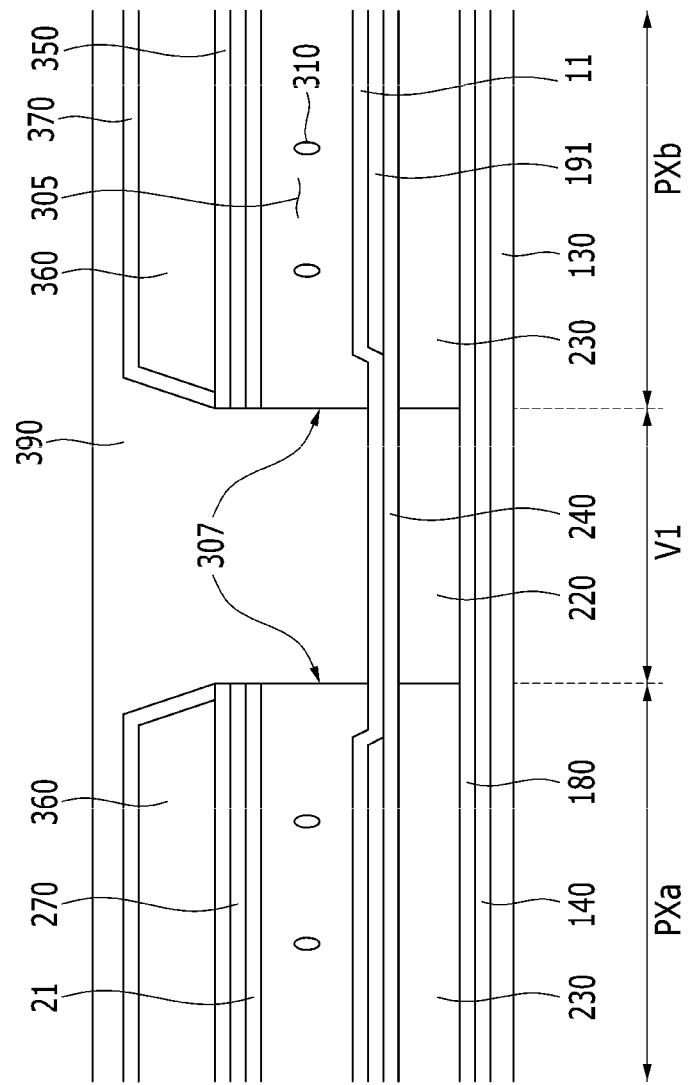
Figure 24:
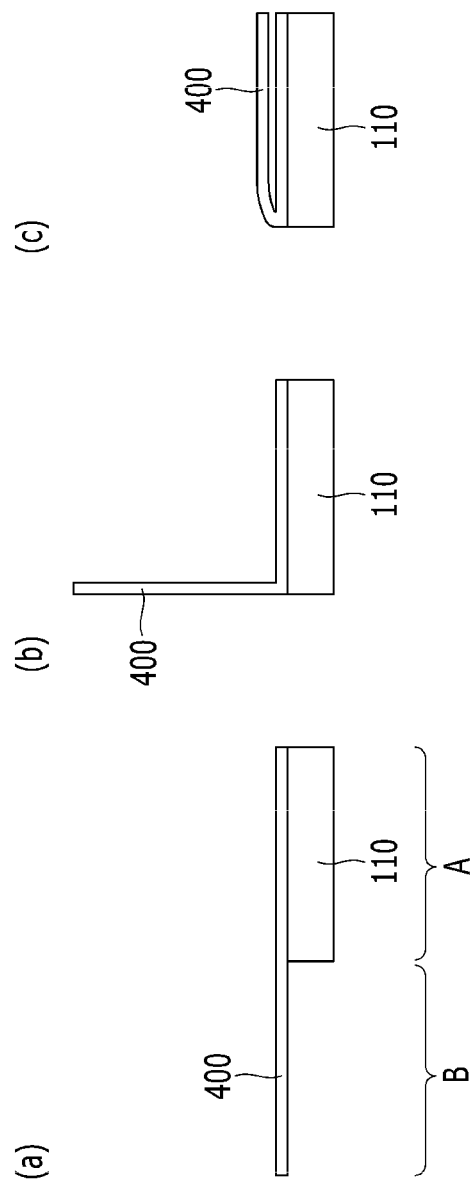
FIG. 24, FIG. 25, FIG. 26A and FIG. 26B illustrate various applications of a display device according to the exemplary embodiment of the present invention.

Next, the substrate 110 is removed from the area of the flexible part B. FIG. 23 illustrates a cross section of the area of the flexible part B from which the substrate 110 is removed.

Next, although not illustrated, the polarizers may be further formed on the upper and lower surfaces of the display device. In this case, the lower polarizer is formed on the substrate 110 and the exposed plastic layer 130.

As described above, a display device according to the exemplary embodiment of the present invention includes only a portion of the substrate. That is, the display device has a fixed part A in which the substrate is present, and a flexible part B in which the substrate is not present. That is, the lower portion of the flexible part B does not include the substrate 110, and therefore the flexible part B may be more freely bent or warped as desired.

FIG. 24, FIG. 25, FIG. 26A and FIG. 26B illustrate various applications of a display device according to the exemplary embodiment of the present invention.

Referring to FIGS. 24A to 24C, the flexible part B may be freely unfolded and folded. That is, as illustrated in FIG. 24A, the display area may be used in a flat form. Alternatively, as illustrated in FIG. 24B, a portion (flexible part) of the display area can be folded and thus the display area may also be used in a right angle state. Alternatively, as illustrated in FIG. 24C, when the display area is not used, the display may be stored in a folded state.

Figure 25:
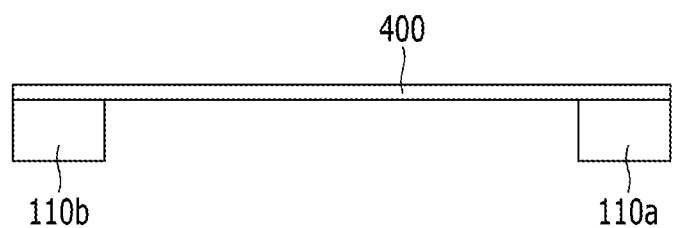

FIG. 25 illustrates a cross section of a display device according to another exemplary embodiment of the present invention. Referring to FIG. 25, in the display device according to the exemplary embodiment of the present invention, substrates 110a and 110b are positioned at an edge of the display device, while a central area of the display device has the substrate removed therefrom. That is, the fixed part A is positioned at the edge and the flexible part B is positioned at the center of the display device.

Figure 26A:
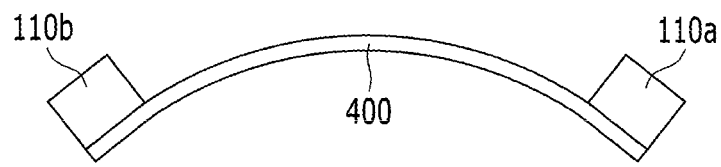
Figure 26B:
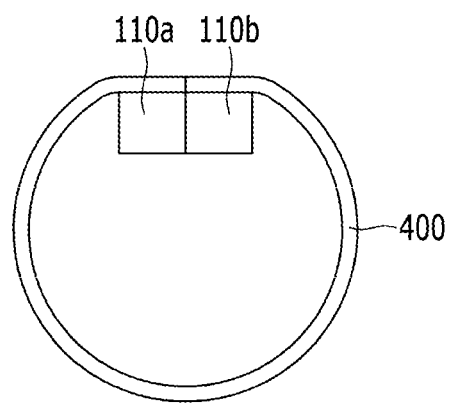

FIGS. 26A to 26B illustrate applications of the display device as illustrated in FIG. 25. As illustrated in FIG. 26A, the display device may be bent in-between both fixed parts A. Therefore, a curved display may be implemented if desired.

Alternatively, as illustrated in FIG. 26B, the flexible part is bent until both of the substrates 110a and 110b contact each other, and thus a cylindrical display may be implemented.

Further, although not illustrated, a structure in which the fixed part is formed at the center of the display and the flexible part is formed at the edge of the display may be implemented. A structure in which the fixed part and the flexible part are formed in alternating manner may also be possible. Indeed, any shapes of the fixed and flexible parts are contemplated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

| <Description of symbols> | |
|---|---|
| 11: First alignment layer | 21: Second alignment layer |
| 110: Substrate | 130: Plastic layer |
| 121: Gate line | 123: Step down gate line |
| 124h: First gate electrode | 124l: Second gate electrode |
| 124c: Third gate electrode | 131: Sustain electrode line |
| 140: Gate insulating layer | 154h: First semiconductor |
| 154l: Second semiconductor | 154c: Third semiconductor |
| 171: Data line | 173h: First source electrode |
| 173l: Second source electrode | 173c: Third source electrode |
| 175h: First drain electrode | 175l: Second drain electrode |
| 175c: Third drain electrode | 180: Passivation layer |
| 191: Pixel electrode | 191h: First subpixel electrode |
| 191l: Second subpixel electrode | 220: Light blocking member |
| 230: Color filter | 240: First insulating layer |
| 270: Common electrode | 300: Sacrificial layer |
| 305: Microcavity | 307: Injection hole ("inlet"?) |
| 310: Liquid crystal molecule | 350: Second insulating layer |
| 360: Roof layer | 370: Third insulating layer |
| 390: Overcoat | |

What is claimed is:

1. A display device, comprising:
   a substrate;
   a plastic layer positioned on the substrate and including a fixed part and a flexible part;
   a plurality of thin film transistors formed on the plastic layer and comprising a thin film transistor;
   a pixel electrode connected to the thin film transistor, wherein the plastic layer is positioned between the pixel electrode and the substrate;
   a roof layer facing the pixel electrode; and
   a liquid crystal layer within a plurality of microcavities formed between the pixel electrode and the roof layer, wherein the substrate is coupled to the fixed part of the plastic layer and the substrate is absent from the flexible part.

2. The display device of claim 1, wherein
   the substrate comprises glass.

3. The display device of claim 1, wherein:
   the plastic layer includes polyimide.

4. The display device of claim 1, wherein:
   the flexible part is sufficiently flexible so as to be folded or rolled.

5. The display device of claim 4, wherein:
   the flexible part is foldable so as to contact the fixed part while forming a right angle with respect to the fixed part.

6. The display device of claim 4, wherein:
the flexible part is foldable so as to cover an upper portion of the fixed part.
7. The display device of claim 4, wherein:
the display device comprises multiple ones of the fixed parts, at least some of which are positioned at edges of the display device, and the flexible part is positioned at a central area of the display device.
8. The display device of claim 7, wherein:
the display device has a curved shape.
9. The display device of claim 7, wherein:
the display device has a cylindrical shape.
10. The display device of claim 1, further comprising:
an overcoat formed on the liquid crystal layer to encapsulate the liquid crystal layer.
11. The display device of claim 10, further comprising:
an upper polarizer formed on the overcoat; and a lower polarizer formed beneath the substrate and beneath a portion of the plastic layer exposed from the substrate.
12. The display device of claim 4, wherein:
a module connecting part attached to the fixed part.

\* \* \* \* \*